United States Patent [19]
Bauer et al.

[11] Patent Number: 5,141,210
[45] Date of Patent: Aug. 25, 1992

[54] LONGITUDINALLY ADJUSTABLE GAS SPRING

[75] Inventors: Hans J. Bauer, Altdorf; Herbert Wolf, Nuremberg; Hans-Peter Bauer, Altdorf, all of Fed. Rep. of Germany

[73] Assignee: Suspa Compart Aktiengesellschaft, Altdorf, Fed. Rep. of Germany

[21] Appl. No.: 672,805

[22] Filed: Mar. 21, 1991

[30] Foreign Application Priority Data

Mar. 21, 1990 [DE] Fed. Rep. of Germany ....... 4009035

[51] Int. Cl.⁵ ............................. F16F 9/34; F16F 9/43
[52] U.S. Cl. ............................. 267/64.12; 137/625.12; 137/625.4; 188/300; 188/322.21; 248/161; 248/631; 297/355; 267/64.28
[58] Field of Search .......................... 267/64.12, 64.28; 188/300, 322.21; 297/355; 248/161, 631; 137/625.12, 625.4

[56] References Cited

U.S. PATENT DOCUMENTS

| | | | |
|---|---|---|---|
| 2,764,181 | 10/1956 | Richolt | 137/625.4 X |
| 2,922,497 | 1/1960 | Porter | 188/300 |
| 2,992,817 | 7/1961 | Templeton | |
| 3,913,901 | 10/1975 | Molders | 188/300 |
| 4,044,866 | 8/1977 | Ishida | 188/322.21 |

FOREIGN PATENT DOCUMENTS

| | | |
|---|---|---|
| 1282364 | 7/1969 | Fed. Rep. of Germany . |
| 2528980 | 1/1977 | Fed. Rep. of Germany . |
| 2099956 | 12/1982 | United Kingdom ........... 188/322.21 |

*Primary Examiner*—George E. A. Halvosa
*Attorney, Agent, or Firm*—Browdy and Neimark

[57] ABSTRACT

A longitudinally adjustable gas spring has a valve having a valve pin arranged to be moved within a valve body. On both sides of the inner chamber of the valve body annular seals are arranged and bear against the cylindrical sections of different diameters. To bridge at least one annular seal grooves are formed in an associated cylindrical section. When the corresponding annular seal is bridged by a displacement of the valve pin, the respective annular seal remains in its position bearing against the cylindrical external surface of the corresponding cylindrical section, so that the wear of the seals implying the gas spring to become unserviceable is eliminated, 13 Claims, 1 Drawing Sheet

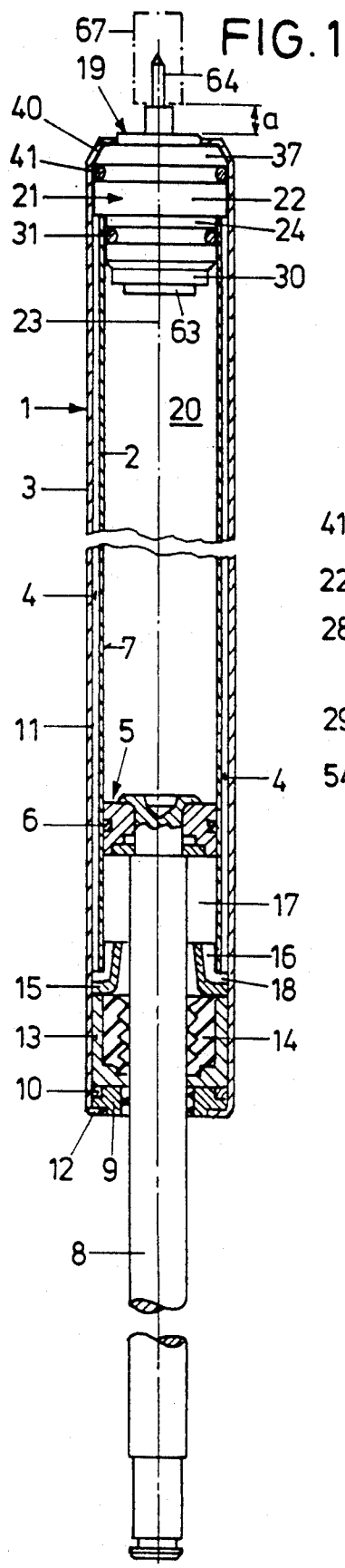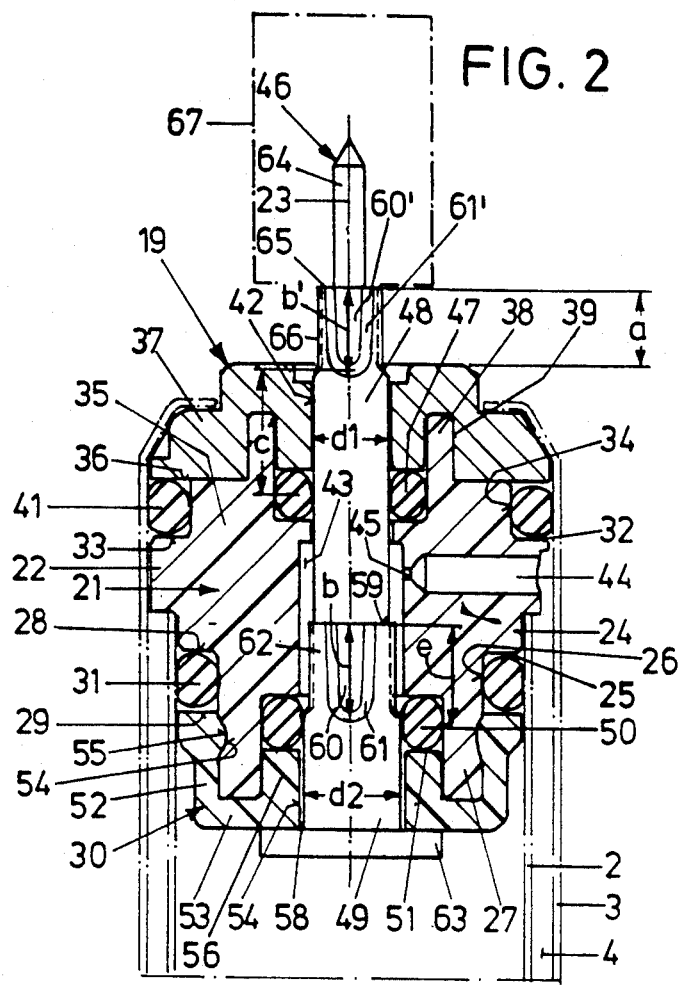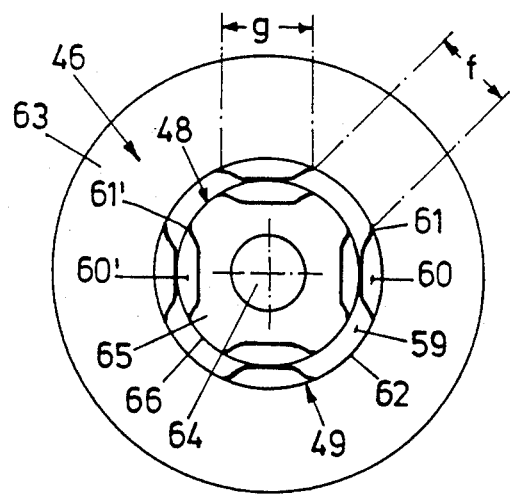

LONGITUDINALLY ADJUSTABLE GAS SPRING

FIELD OF THE INVENTION

The invention relates to a longitudinally adjustable gas spring with two cylinders enclosing each other concentrically, defining a free space and being filled at least partially with a compressed gas, with a piston arranged slidably in an inner cylinder and connected with a piston rod guided to exit in a sealed off manner at one end of the cylinders, with a valve closing the cylinders outwards at the end opposite to where the piston rod exits to connect the free space with the housing chamber neighbouring the valve in the inner cylinder, the valve having a valve body, in which an inner chamber of the valve body is formed, which is axially passed through by a valve pin, which chamber is connected with the free space, and which is sealed off outwards by an annular seal bearing against a cylindrical external surface of a cylindrical section of smaller diameter of the valve pin, and which is sealed off towards the adjacent housing chamber by an annular seal arranged at a distance from the annular seal and bearing against a cylindrical external surface of a cylindrical section of greater diameter of the valve pin, the inner chamber of the valve body being connectable with the housing chamber by displacement of the valve pin, which projects outwards over the valve body in a position of rest, out of this position of rest in a direction towards the adjacent housing chamber by a valve-actuation-path of a maximum length.

BACKGROUND OF THE INVENTION

Longitudinally adjustable gas springs of this type are for example known from JP-U-51-153 and EP-B1-0 219 362. In this case a conical or frusto-conical transition section is formed between the two cylindrical sections of the valve pin. For actuation of the valve the valve pin is pushed into the valve body in the direction towards the adjacent housing chamber to such an extent that the annular seal neighbouring the housing chamber is completely lifted off the cylindrical section of greater diameter, so that a passage is realized from the inner chamber of the valve body to the adjacent housing chamber. The disadvantage of this solution resides in that the annular seal neighbouring the housing chamber is heavily milled and sheared upon closing of the valve, when the cylindrical section of greater diameter of the valve pin is pulled through the annular seal and widens it, as a result of which there is the risk of the annular seal to be damaged, which may render the gas spring unserviceable. Comparable problems arise, when the annular seal sealing outwards is bridged by the valve pin being pushed very deeply into the valve body for the purpose of filling compressed gas into the gas spring.

SUMMARY OF THE INVENTION

It is accordingly an object of the invention to embody a gas spring of the generic kind in such a manner that damaging of the annular seal serving as a seal between the inner chamber of the valve body and the adjacent housing chamber is avoided.

This object is attained in accordance with the invention by the features that at least one groove extending in the direction of displacement is formed in the cylindrical section of greater diameter, which groove is located on the side of the annular seal facing away from the adjacent housing chamber in the position of rest of the valve pin, and which groove bridges the annular seal upon displacement of the valve pin, and in that, in the position of rest of the valve pin, the cylindrical section of greater diameter extends towards the inner chamber of the valve body by a length corresponding at least to the maximum valve-actuation-path. Hereby it is achieved that, even when the valve pin is moved to actuate the gas spring or to adjust it in length, the annular seal always bears on the cylindrical section of greater diameter of the valve pin, so that no milling or shearing of the annular seal occurs when the valve is closed.

According to an advantageous embodiment of the invention identical measures and the identical structure are in principle provided to avoid a corresponding damaging of the annular seal sealing outwards when the gas spring is filled with compressed gas.

Further advantages and features of the invention will become apparent from the ensuing description of an exemplary embodiment taken in conjunction with the drawings.

BRIEF DESCRIPTION OF THE DRAWINGS

FIG. 1 is a longitudinal section through a longitudinally adjustable gas spring according to the invention, FIG. 2 is a longitudinal section on an enlarged scale of the valve of the gas spring according to the invention according to FIG. 1, and FIG. 3 is a top view of the valve pin of the valve of the gas spring.

DESCRIPTION OF THE PREFERRED EMBODIMENT

The longitudinally adjustable gas spring shown in FIG. 1 has a housing 1 substantially comprising two tubes of different diameter concentrically supported one within the other, namely an inner cylinder 2 and an outer cylinder 3. An annular space 4 is formed between the outer cylinder 3 and the inner cylinder 2 as a result of the difference in diameter of the inner cylinder 2 and the outer cylinder 3.

An approximately annular piston 5 is arranged to be axially displaceable in the inner cylinder 2 and is made gas tight with its outer circumference towards the inner wall 7 of the inner cylinder 2 by way of a sealing ring 6. The piston 5 is secured to one end of a piston rod 8 guided coaxially relative to the housing 1. This piston rod 8 exits at one end of the housing 1. At this end the housing 1 is closed by a closing disk 9, which, on its outer circumference, is made gas tight towards the inner wall 11 of the outer cylinder 3 by means of an annular seal 10. The closing disk 9 is held axially outwards by a flanging 12 of the outer cylinder 3. On the inner side a cup-shaped sleeve 13 bears against the closing disk 9 and receives a multiple-lip-type seal 14 bearing with its lips against the piston rod 8 in a sealing manner. Thus any exit of gas outwards is eliminated along the surface of the piston rod 8.

A centring piece 15 supported in a direction from the inner chamber of the housing 1 on the inner wall 11 of the outer cylinder 3 bears against the sleeve 13 and is provided with ribs 16, on which the inner cylinder 2 with its inner wall 7 is radially supported, i.e. centred. The inner cylinder 2 is also axially firmly supported on these ribs 16, i.e. it is axially unilaterally fixed. Due to the fact that only ribs 16 are provided to centre and axially support the inner cylinder 2, in this area the annular space 4 is connected with the housing chamber 17 in the inner cylinder 2 defined between the piston 5, the end of the housing 1 on the side where the piston rod exits and the inner wall 7 of the inner cylinder 2. Between the ribs 16 relief channels 18 are thus formed between the housing chamber 17 and the annular space 4. A valve 19 is arranged at the end of the housing 1 opposite the end where the piston rod exits and by means of this valve 19 the housing chamber 20 located in the inner cylinder 2 between the piston 5 and the valve 19 can be connected with the annular space 4 and thus with the other housing chamber 17 or it can be separated from it.

The valve 19 has a valve body 21 provided with an annular collar 22 in its axially central area, which annular collar 22 bears against the inner wall 11 of the outer cylinder 3, whereby the valve body 21 is centred in the outer cylinder 3. This annular collar 22 is the section of greatest diameter on the total valve body 21. Whenever the term "axial" is used in the description this always refers to the central longitudinal axis 23 of the gas spring, which at the same time also is the axis of symmetry of all component parts and constructional groups of parts.

In the direction towards the housing chamber 20 the annular collar 22 is followed by a centring collar 24 of smaller diameter bearing against the inner wall 7 of the inner cylinder 2 thus centring the latter relative to the outer cylinder 3. At the same time the inner cylinder 2 bears with its associated edge against the side face of the annular collar facing it, thus being held axially.

As shown in FIG. 2, in the direction towards the housing chamber 20 the centring collar 24 is in turn followed by an outer groove 25, of which the bottom 26 is formed by a sleeve-like section 27 of the valve body 21, of which the outer diameter is in turn smaller than the outer diameter of the centring collar 24. A side wall 28 of the outer groove 25 facing the annular collar 22 is formed by the corresponding side face of the centring collar 24 at the transition from the latter to the section 27. The other side wall 29 of the outer groove 25 facing the housing chamber 20 is formed by a cover 30. An outer annular seal 31 is located in the outer groove 25 and bears to seal against the inner wall 7 of the inner cylinder 2, so that a gas passage is prevented in the short-circuit from the housing chamber 20 to the annular chamber 4 and thus to the other housing chamber 17.

Seen in axial direction towards the outside of the housing 1 the annular collar 22 is followed by an outer groove 32, of which one side wall 33 facing the other outer groove 25 is formed by the corresponding side face of the annular collar 22. Its bottom 34 is formed by an annular section 35, which follows the annular collar 22 and of which the outer diameter is smaller than that of the annular collar 22. The side wall 36 of the outer groove 32 located towards the outside of the housing 1 is formed by an annular disk 37. This annular disk 37 is arranged on an annular cylindrical guiding section 38 of the valve body 21, of which the outer diameter is in turn smaller than that of the annular section 35. The annular disk 37 is secured to the cylindrical external surface 39 of the guiding section 38 with press-fit. As can be seen from FIG. 1, the outer edge of the outer cylinder 3 surrounds the outside of the annular disk 37 with a flanging 40, whereby the total valve 19 is held outwards and simultaneously pressed axially inwards against the inner cylinder 2.

The valve body 21 consisting of the guiding section 38, the annular section 35, the annular collar 22, the centring collar 24 and the sleeve-like section 27 is formed in one piece of plastics material and—as can be taken from the above description—it is constructed in symmetry to the central longitudinal axis 23, so that it can be injection-moulded in a mould separated only in a plane, which extends at right angles to the axis 23 and which is in turn arranged in the proximity of the annular collar 22. From there the valve body 21 tapers axially towards each of its ends, and that step by step. The annular disk 37 consists of metal. An outer annular seal 41 is arranged in the outer groove 32 and bears against the inner wall 11 of the outer cylinder 3, thus preventing a gas exit to the outside in this area.

The annular disk 37 and the adjacent area of the valve body 21 are provided with a cylindrical coaxial guide bore 42, which is followed by an equally cylindrical inner chamber 43 of the valve body 21. This inner chamber 43 has a greater diameter than the guide bore 42. The manufacturing of this valve body 21 is of no problem even with regard to the inner area, since one core can be used for the inner chamber 43 and for the guide bore 42 following it.

A relief channel 44 passing through the annular collar 22 opens into this inner chamber 43 and, at its outside, runs into the annular space 4. The relief channel 44 is provided with a throttle opening 45 where it opens into the inner chamber 43.

A valve pin 46 is arranged in the valve body 21 and projects outwards over the annular disk 37 and thus over the gas spring. This substantially stepwise cylindrical valve pin 46 is piloted in the guide bore 42. An inner annular seal 47 is arranged at the transition from the guide bore 42 to the inner chamber 43, it is secured axially outwards by the annular disk 37, and bears radially against a cylindrical section 48 of the valve pin 46 on the one hand and against the inner wall of the guiding section 38 on the other hand, so that any gas exit through the guide bore 42 is excluded. The inner annular seal 47 is secured axially in the direction towards the housing chamber 20 by way of the transition on the valve body 21 to the guide bore 42.

At the end of the inner chamber 43 facing the housing chamber 20 another inner annular seal 50 bears against a transition surface from the inner chamber 43 to the section 24, which seal 50 further radially bears against the section 27 and against a further cylindrical section 49 of the valve pin 46. It bears axially relative to the housing chamber 20 against a corresponding bearing face 51 of the cover 30.

The cover 30 is cup-shaped, i.e. it has an outer annular web 52, which extends axially to the outside of the gas spring and where the side wall 29 of the outer groove 25 is formed. It further has an annular-disk-shaped section 53. The annular web 52 is secured to the section 27 by way of a crimp 55 pressed into a groove 54 in the sleeve-like section 27, whereby the cover 30 is secured to the valve body 21. Since the cover 30 consists of plastics material, too, this is easy to realize.

Radially inwards an annular cylindrical web 56 extends away from the annular-disk-shaped section 53 in an axially outwards direction; the inner annular seal 50 bears against this web 56.

The cover 30 has a coaxial bore 57, of which the diameter is greater than the diameter of the section 49 of the valve pin 46 in this area, so that an annular passage channel is formed here.

The cylindrical section 49 of the valve pin 46 has a somewhat greater diameter d2 than the cylindrical section 48 of the valve pin 46, so that the transition from the section 48 to the section 49 is formed by an annular collar 59. Proceeding from this annular collar 59, flat grooves 60 are formed in the cylindrical section 49, of which the edges 61 are rounded, i.e. not square, as can be seen from FIG. 3. The grooves 60 extend away from the annular collar 59 in a direction towards the housing chamber 20 only to such extent, i.e. their length b is such, that, in the shown position of rest of the valve pin 46 corresponding to the closing position of the valve 19, they do not overlap the inner annular seal 50, i.e. they do not bridge it. The distances of the annular seal 50 from the annular collar in the position of rest of the valve pin 46 shown in FIG. 2 is at least somewhat greater than the position b of the grooves 60. In this position of the valve pin 46 the inner annular seal 50 continuously bears only against the cylindrical external surface 62 of the section 49, i.e. it seals the inner chamber 43 of the valve body 21 off the housing chamber 20 in a gas-tight manner. At its end located in the housing chamber 20 the valve pin 46 has a bearing disk, so that it cannot be pressed outwards out of the housing 1 by means of the gas pressure.

When the valve pin 46 is pushed into the valve body 21 in the direction towards the housing chamber 20, then the grooves 60 bridge the inner annular seal 50, the latter continuing to bear against the cylindrical external surface 62 of the cylindrical section 49 between the grooves. The inner annular seal 50 is only bridged in the vicinity of the grooves 60. The rounded edges 61 of the grooves prevent the annular seal 50 from being mechanically stressed in this area. In this bridged position of the inner annular seal 50 gas can flow out of the housing chamber 20 through the passage channel 58, the inner chamber 43, the throttle orifice 45, the relief channel 44, the annular space 4 and the relief channels 18 into the housing chamber 17 or vice versa. When the piston rod 8 enters the housing when the valve 19 is opened, then the compressed gas in the housing flows in the described manner; when no force or only a minor force is exercised on the piston rod while the valve 19 is opened, then the compressed gas flows in opposite direction and pushes the piston 5 with the piston rod 8 in opposite direction, i.e. out of the housing 1. When the valve pin 46 is released, the inner annular seal 50 is no longer bridged by the grooves 60 and thus the flow of gas is interrupted. The piston 5 with the piston rod 8 then remains in a certain position relative to the housing and can balance against the forces exercised by the compressed gas on both sides.

On its side located outside the annular disk 37, i.e. outside the housing 1, the valve pin 46 is integrally formed with a thin pin-like tongue 64, of which the diameter is clearly smaller than the diameter d1 of the adjacent cylindrical section 48. Here, too, the transition from the tongue 64 to the cylindrical section 48 is formed by an annular collar 65. Proceeding from this annular collar 65 grooves 60' are provided in the cylindrical external surface 66 of the section 48, which grooves 60' are formed in the same way as the grooves 60. In like manner they have well rounded edges 61' and a length b', which is clearly smaller than the distance c of the inner annular seal 47 from the groove 60' in the position of rest of the valve pin 46. These grooves 60' serve to fill the gas spring with compressed gas. To this effect the valve pin 46 is moved into the valve body 21 by corresponding engagement with the pin-like shoulder to such an extent that the groove 60' bridges the inner annular seal 47 situated axially outwards, so that compressed gas can be pressed through the guide bore 42 into the inner chamber 43 of the valve body 21, from where it flows through the relief channel 44 and the annular space 4 into the housing chamber 17 and through the passage channel 58 into the housing chamber 20. During this operation the cylindrical section 49 is completely lifted off the inner annular seal 50. After the gas spring has been filled with compressed gas, a release cap 67 roughly shown in dashed lines is secured to the pin-like tongue 64, and a corresponding opening force is exercised upon this release cap 67 for opening the valve. This release cap 67 radially clearly projects over the cylindrical section 48 of smaller diameter located outside and it prevents that, when actuated to adjust the gas spring in length, the valve pin 46 is pushed in to such an extent that a blowing off of the compressed gas might take place via the channels 60'. When the valve pin 46 is in its position most moved in, the release cap 67 bears against the external surface of the annular disk 37, thus defining a maximum valve-actuation-path a of the valve pin 46.

As shown by the above description and the drawings, the valve pin 46 is formed without any narrowing from the tongue 64 to the bearing disk 63; it widens by steps in this direction. It can, therefore, be manufactured very easily by injection in a mould, of which the separating plane lies in the external surface of the bearing disk 63.

As can in particular be seen from FIG. 3, the section of the cylindrical external surface 62 between two adjacent grooves 60 had a width f equalling at least the width g of a groove 60. The width g of a groove 60 therefore approximately extends over one eighth of the circumference of the cylindrical section 49, while the section between two adjacent grooves 60 extends over a width g of at least about one eighth of this circumference. About the same is true for the grooves 60' in the cylindrical section 48.

The annular space 4 is a free space, i.e. it can on the one hand only be a pure relief space serving to connect the two housing chambers 17 and 20. On the other hand it can also have the function of a balancing space when not connected with the housing chamber 17.

The valve pin 46 may consist of a polyamide or ana acetal resin.

What is claimed is:

1. A longitudinally adjustable gas spring comprising:
   an outer cylinder (3) and an inner cylinder (2) enclosing each other concentrically to a common axis (23) and thereby defining a free space (4) between said outer cylinder (3) and said inner cylinder (2);
   each said outer cylinder and said inner cylinder having a first end and a second end;
   a piston (5) slidably arranged in the inner cylinder (2) and defining a first housing chamber (17) being steadily connected with said free space (4) and a second housing chamber (20), said first and second housing chambers (17, 20) and said free space being at least partially filled with a compressed gas;
   guiding and sealing means for closing said outer cylinder (3) and said inner cylinder (2) at said first end of said outer cylinder (2) and said inner cylinder (3);
   a piston rod (8) extending through said first housing chamber (17) and guided in said guiding and sealing means out of said outer cylinder (2) and said inner cylinder (3) in a sealed manner;

a valve (19) closing said outer cylinder (2) and said inner cylinder (3) outwards at said second end of said outer cylinder (2) and said inner cylinder (3) to connect said free space (4) with said second housing chamber (20) neighboring said valve (19), said valve (19) having a valve body (21), an inner chamber (43) formed in said valve body (21) and connected with said free space (4), a valve pin (46) extending through said inner chamber (43) in the direction of and concentrically to said common axis (23) and being provided with a first cylindrical section (48) having a first cylindrical external surface (66) with a first diameter (d1) and being provided with a second cylindrical section (49) having a second cylindrical external surface (62) with a second diameter (d2) whereby the first diameter (d1) is smaller than the second diameter (d2), said valve pin (46) projects outwards over said valve body (21) in a position of rest and which is displaceable out of this position of rest in a direction of the common axis (23) towards said second housing chamber (20) by a valve-actuation-path of a predetermined maximum length (a) to connect said inner chamber (43) with said second housing chamber (20).

a first annular seal (47) bearing against said first cylindrical external surface (46) and sealing off said inner chamber (43) outwards, a second annular seal (50) arranged at a distance from said first annular seal (47) and bearing against said second cylindrical external surface (62) and sealing off said inner chamber (43) towards said second housing chamber (20), wherein at least one first groove (60) extending parallel to and in the direction of the common axis (23) is formed in the second cylindrical section (49), which first groove (60) is located on a side of said second annular seal (50) facing away from the second housing chamber (20) in the position of rest of said valve pin (46), and which first groove (60) bridges said second annular seal (50) upon displacement of said valve pin (46), wherein, in the position of rest of said valve pin (46) the second cylindrical section (49) extends from said second annular seal (50) towards said inner chamber (43) of said valve body (21) by a length (e) corresponding at least to the predetermined maximum length (a) of the valve-actuation-path and wherein said at least one first groove (60) opens into an annular collar (59), in which said second cylindrical section (49) terminates.

2. A gas spring according to claim 1, wherein said at least one first groove (60) has rounded edges (61) which pass into said second cylindrical external surface (62) of said second cylindrical section (49).

3. A gas spring according to claim 1, wherein, between two first grooves (60) formed on said second cylindrical section (49), a section of said second cylindrical external surface (62) is formed, of which the width (f) corresponds to at least one eighth of the circumference of said second cylindrical external surface (62).

4. A gas spring according to claim 1, wherein the at least one first groove (60) has a width (g) corresponding to at maximum one eighth of the circumference of said second cylindrical external surface (62).

5. A gas spring according to claim 1, wherein the valve pin (46) is provided with a bearing disk (63) at an end facing said second housing chamber (20).

6. A gas spring according to claim 1, wherein the valve pin (46) is integrally made of plastics material.

7. A longitudinally adjustable gas spring comprising:

an outer cylinder (3) and an inner cylinder (2) enclosing each other concentrically to a common axis (23) and thereby defining a free space (4) between said outer cylinder (3) and said inner cylinder (2); each said outer cylinder and said inner cylinder having a first end and a second end;

a piston (5) slidably arranged in the inner cylinder (2) and defining a first housing chamber (17) being steadily connected with said free space (4) and a second housing chamber (20), said first and said second housing chambers (17, 20) and said free space being at least partially filled with a compressed gas;

guiding and sealing means for closing said outer cylinder (3) and said inner cylinder (2) at said first end of said outer cylinder (3) and said inner cylinder (2);

a piston rod (8) extending through said first housing chamber (17) and guided in said guiding and sealing means out of said outer cylinder (3) and said inner cylinder (2) in a sealed manner;

a valve (19) closing said outer cylinder (2) and said inner cylinder (3) outwards of said second end of said outer cylinder (3) and said inner cylinder (2) to connect said free space (4) with said second housing chamber (20) neighboring said valve (19), said valve (19) having a valve body (21), an inner chamber (43) formed in said valve body (21) and connected with said free space (4), a valve pin (46) extending through said inner chamber (43) in the direction of and concentrically to said common axis (23) and being provided with a first cylindrical section (48) having a first cylindrical external surface (66) with a first diameter (d1) and being provided with a second cylindrical section (49) having a second cylindrical external surface (62) with a second diameter (d2) whereby the first diameter (d1) is smaller than the second diameter (d2), which valve pin (46) projects outwards over said valve body (21) in a position of rest and which is displaceable out of this position of rest in a direction of the common axis (23) towards said second housing chamber (20) by a valve-actuation-path of a predetermined maximum length (a) to connect said inner chamber (43) with said second housing chamber (20), a first annular seal (47) bearing against said first cylindrical external surface (46) and sealing off said inner chamber (43) outwards, a second annular seal (50) arranged at a distance from said first annular seal (47) and bearing against said second cylindrical external surface (62) and sealing off said inner chamber (43) towards said second housing chamber (20), wherein at lest one first groove (60) extending parallel to and in the direction of the common axis (23) is formed in the second cylindrical section (49), which first groove (60) is located on a side of said second annular seal (50) facing away from the second housing chamber (20) in the position of rest of said valve pin (46), and which first groove (60) bridges said second annular seal (50) upon displacement of the valve pin (46), wherein, in the position of rest of said valve pin (46) the second cylindrical section (49) extends from said second annular seal (50) towards the inner chamber (43) of said valve body (21) by a length (e) corresponding at least to the predetermined maximum length (a) of the valve-actuation-path, wherein at least one second groove (60') extending parallel to and in the direction of the common axis (23) is formed in said first cylindrical section (48), which second groove (60) is spaced apart from said first annular seal (47) by a path (c) which is longer than the maximum length (a) of said valve-actuation-path in the position of rest of the valve pin (46), and which second groove (60') bridges said first annular seal (47) and connects the inner chamber (43) of the valve body (21) outwards when the valve pin (46) is displaced in a direction towards said second housing chamber (20) beyond the predetermined maximum length (a) of the valve-actuation-path, wherein said at least one first groove (60) opens into an annular collar (59), in which said second cylindrical section (49) terminates, and wherein an at least one second groove (60') opens into an annular collar (65), in which said first cylindrical section (48) terminates.

8. A gas spring according to claim 7, wherein said at least one second groove (60') has rounded edges (61') which pass into said first cylindrical external surface (66) of said first cylindrical section (48).

9. A gas spring according to claim 7, wherein, between two second grooves (60') formed on said first cylindrical section (48), a section of said first cylindrical external surface (66) is formed, of which the width (f) corresponds to at least one eighth of the circumference of said first cylindrical external surface (66).

10. A gas spring according to claim 7, wherein the at least one second groove (60') has a width (g) corresponding to at maximum one eighth of the circumference of said first cylindrical external surface (66).

11. A gas spring according to claim 7, wherein said first cylindrical section (48) is provided with a pin-like tongue (64) extending outwards and tapered in relation to said first cylindrical section (48).

12. A gas spring according to claim 7, wherein the valve pin (46) is provided with a bearing disk (63) at an end facing said second housing chamber (20).

13. A gas spring according to claim 7, wherein the valve pin (46) is integrally made of plastics material.

* * * * *